United States Patent Office 3,391,019
Patented July 2, 1968

3,391,019
PROCESS FOR COATING SHAPED HYDROPHOBIC POLYMERIC MATERIALS WITH REACTION PRODUCT OF HALOGENOTRIAZINE AND POLYMER CONTAINING HYDROXYL, AMINO OR MERCAPTO GROUP
John Bryn Owen and Harold Sagar, Manchester, England, assignors to Imperial Chemical Industries Limited, London, England, a corporation of Great Britain
No Drawing. Filed Feb. 4, 1965, Ser. No. 430,480
Claims priority, application Great Britain, Feb. 21, 1964, 7,390/64
5 Claims. (Cl. 117—138.8)

ABSTRACT OF THE DISCLOSURE

A process for coating shaped articles composed at least in part of hydrophobic polymeric material such as polyethylene terephthalate to reduce hydrophobic properties and a tendency to become electrified. The process comprises applying to the said article a polymeric substance containing at least one reactive —OH, =NH or —SH group in each molecule and a halogenotriazine, and thereafter treating the said article in such a way that the said polymeric substance and the halogenotriazine are caused to react with each other.

---

This invention relates to a coating process and more particularly it relates to the coating of shaped articles composed at least in part of hydrophobic palymeric materials.

By the term hydrophobic polymeric material we mean polymeric material which has a limited capacity for absorbing moisture. Such material includes polyolefins, such as polyethylene and polypropylene, polyamides such as nylon, including polymers of caprolactam, polyesters such as polyethylene terephthalate, polymers and copolymers of acrylonitrile, cellulose esters such as cellulose triacetate and glass.

Shaped articles composed at least in part of hydrophobic polymeric material may be of any desired kind. They may be obtained from the polymeric material by any known shaping process for example by casting, moulding or extrusion. The process of our invention is particularly applicable, however, to sheets, foils and films composed of hydrophobic polymeric material.

It is well known that shaped articles made from hydrophobic polymeric material besides having a very limited capacity for absorbing moisture become electrified readily when subjected to friction. These properties are disadvantageous in that the electrified articles readily attract dirt and dust. Moreover, film composed of hydrophobic polymeric material which has become electrified is difficult to handle in that it becomes attracted to and clings to other articles. It is an object of the present invention to decrease the hydrophobic properties and reduce the tendency of such shaped articles to become electrified.

We have now found that by coating the shaped articles with certain reactive polymeric substances and fixing the coating by reaction with a halogenotriazine the hydrophobic properties of the articles are decreased and the tendency to become electrified is reduced.

Thus according to the present invention we provide a process for coating shaped articles composed at least in part of hydrophobic polymeric material which comprises applying to the said article a polymeric substance containing at least one reactive —OH, =NH or —SH group in each molecule and a halogenotriazine, and thereafter treating the said article in such a way that the said polymeric substance and the halogenotriazine are caused to react with each other.

Polymeric substances containing at least one reactive —OH, =NH or —SH group in each molecule which are of particular value for use in the present invention include both natural and synthetic polymers and as examples of such substances there may be mentioned polyvinyl alcohol which may or may not be partially esterified; proteinaceous materials such as gelatin and casein; alginic acid and its water-soluble salts such as sodium alginate; starch and starch derivatives such as starch dextrins and starch ethers, for example hydroxypropyl starch; cellulose ethers such as methyl cellulose, hydroxyethyl cellulose and hydroxypropyl methyl cellulose; tannic acid; deacetylated chitin; the condensates of polyols such as glycerol and mannitol, and of polyamines with alkylene oxides; partially hydrolysed polyacrylonitriles; and polyalkyleneoxy derivatives of amides and amines as further described in German patent specifications Nos. 907,701, 912,916, 956,400 and 1,023,743.

Mixtures of such polymeric substances may be used if desired. Preferably the substances are soluble in or dispersible in aqueous media, for example water or dilute solutions of acids or alkalis; usually they are strongly film-forming solids. Particularly valuable for use in the process of the invention are the hydroxyalkyl celluloses, for example hydroxyethyl cellulose.

By a halogenotrazine we mean any organic compound containing at least one 1,3,5-triazine ring which carries at least one halogen atom attached to a carbon atom thereof. Especially useful in the present process are the non-colored or colored halogenotriazine compounds which are water soluble owing to the presence in an organic radical attached to the triazine ring of one or more solubilising groups such as sulphonic acid or carboxylic acid salt groups, non-ionic groups, or quaternary ammonium groups for example sodium 2-(2,6-dichloro-1,3,5-triazin-2-yl)aminonaphthalene-6-sulphonate,
sodium 1-(4,6-dichloro-1,3,5-triazin-2-yl)aminonaphthalene-5-sulphonate,
sodium β-(4,6-dichloro-1,3,5-triazin-2-yl)aminoethane sulphonate,
sodium 1,4-bis[(chloro-6-methoxy-1,3,5-triazin-2-yl)amino]benzene-2-sulphonate,
1-amino-4-[4'-(4,6-dichloro-1,3,5-triazin-2-yl)amino-3'-sulphonanilino]anthraquinone-2,5-disulphonate,
3-(4,6-dichloro-1,3,5-triazin-2-yl)aminophenyltrimethyl-ammonium bromide.

The polymeric substance and the halogenotriazine may be applied to the shaped article together or in separate steps. Where the polymeric substance contains reactive —OH groups or —SH groups it is usually necssary to employ an alkaline agent together with the halogenotriazine. As examples of alkaline agents which may be used in the invention there may be mentioned potassium hydroxide, sodium hydroxide, sodium bicarbonate, potassium bicarbonate, sodium carbonate, potassium carbonate, trisodium phosphate, sodium sulphite and mixtures thereof. The alkaline agents may be applied simultaneously with the other reactants or in a separate step.

It is preferred, though not essential, to apply the reactants from aqueous media. Although aqueous dispersions may be employed, it is convenient to apply the reactants from aqueous solution, and for this purpose the polymeric substance and the halogenotriazine are dissolved in water or in aqueous alkali or acid.

The solutions or dispersions of the reactants are applied to the shaped articles by any suitable means for example by dipping, brushing or spraying, or by means of a roller or a squeegee.

After the reactants have been applied the coating is fixed by the polymeric substance and the halogenotriazine reacting with each other. In some cases no special steps are necessary to cause the reaction to occur. In other cases it is desirable to accelerate and complete the reaction by means of a heat treatment. Suitable heat treatments are for example for from 5 seconds to 10 minutes at temperatures ranging from 40° C. to 130° C. Reaction times are short when alkali metal hydroxides are employed and a separate heating step to complete the reaction is not then essential. When strong alkalis are employed it is convenient to apply them in a separate treatment and to complete the process by neutralising rinsing and drying.

When the reactive polymeric substance depends for its reactivity on the presence of amino groups it may be necessary to dissolve or disperse it in an aqueous acid. If a weak volatile acid is employed to bring the reactive polymeric substance into solution, for example dilute acetic acid, the polymeric substance may sometimes be employed in admixture with the reactive triazine, the reaction being brought about when the treated article is dried and heated. Although it is not always necessary to use alkalis to accelerate reaction between the halogenotriazine and the polymeric material containing amino groups, if alkali is used to adjust the pH the alkali and the acid solution should be employed separately.

The application of the coating results in an increase in the dry weight of the shaped article. The increase in weight usually ranges from 0.01% to 5%. In the case of a film it is preferred to apply a coat weight of not more than 1.0% of the weight of the film and amounts of from 0.05% to 1.0% are preferred. Usually the major proportion of the weight increase is brought about by deposition on the shaped article of the polymeric substance, and it may only be necessary to use just sufficient of the halogenotriazine to destroy the solubility of the polymeric substance in aqueous media such as water or dilute alkalis. Indeed for some kinds of effect which can be obtained by the process of the invention, for example the anti-static effect, the use of too high a ratio of halogenotriazine to polymeric substance is undesirable. Usually the halogenotriazine is used in the proportion of 0.05% to 50% by weight of the reactive polymeric substance, but we prefer to use between 1% and 10%. Normally, the amount of alkali deposited on the shaped article will lie between the limits of 0.05% and 5% and preferably between 0.1% and 1% based on the dry weight of the shaped article.

The application of the coating according to the process of the invention results in the shaped articles having an increased moisture absorbency and a reduced tendency to acquire charges of static electricity with the result that the disadvantages hereinbefore mentioned are minimised. Where the halogenotriazine is colored, a colored coating is imparted. The coating may also lead to improved heat seal-ability of the film.

Because the reaction of the polymeric substance and the halogenotriazine results in a coating which is insoluble in water the effects imparted are resistant to the action of water and to washing and cleaning operations.

If desired other substances may be applied to the shaped article in conjunction with the polymeric substance and the halogenotriazine to confer specific properties.

The invention is illustrated but not limited by the following example in which parts and percentages are by weight:

Example

A piece of a polyethylene terephthalate film was dipped in an aqueous solution containing 0.5 part of a hydroxyethyl cellulose, 0.08 part of sodium 1-(4,6-dichloro-1,3,5-triazin-2-yl)aminonaphthalene-5-sulphonate, 0.1 part of sodium bicarbonate, and 99.32 parts of water, and subsequently squeezed between two glass rods so as to retain 120% of its dry weight of liquor. After drying at 70° C., the film was baked at 150° C. for 3 minutes, rinsed with water to remove any unreacted material, and dried.

Compared to an untreated control film, the treated film showed a reduced tendency to acquire and retain charges of static electricity.

This effect was maintained after the treated film was boiled in water for 30 minutes.

What we claim is:

1. A process for coating a shaped polyethylene terephthalate article which comprises applying to said article an aqueous solution containing (1) a water-soluble polymeric material containing at least one reactive group selected from the group consisting of hydroxyl, amino and mercapto groups, (2) an organic compound which contains at least one sulphonic acid salt group and at least one 1,3,5-triazine ring which carries at least one chlorine atom attached to a carbon atom thereof, and (3) a non-volatile alkaline agent, squeezing the article, drying it and then baking it at a temperature within the range 40° C. to 230° C. for from 5 seconds to 10 minutes to thereby impart antistatic properties to said article, the quantities of the reactants (1), (2) and (3) and the proportion of the aqueous solution removed during squeezing being so chosen that the increase in the weight of the article is between 0.05% and 1.0% of the dry weight of the article, the weight of the reactant (2) being between 0.05% and 50% of the weight of the reactant (1) and the weight of the reactant (3) being between 0.1% and 1% of the dry weight of the article.

2. A process as set forth in claim 1 wherein said water-soluble polymeric material is a cellulose ether.

3. A process as set forth in claim 1 wherein said water-soluble polymeric material is a hydroxyalkyl cellulose.

4. A process for coating polyethylene terephthalate film which comprises immersing the film in an aqueous solution containing (1) hydroxy-ethyl cellulose, (2) an organic compound which contains at least one sulphonic acid salt group and at least one 1,3,5-triazine ring which carries at least one chlorine atom attached to a carbon atom thereof, and (3) a non-volatile alkaline agent, squeezing the film, drying it and then baking it at a temperature within the range 40° C. to 230° C. for from 5 seconds to 10 minutes, the quantities of the reactants (1), (2) and (3) and the proportion of the aqueous solution removed during squeezing being so chosen that the increase in the weight of the film is between 0.05% and 1.0% of the dry weight of the film, the weight of the reactant (2) being between 0.05% and 50% of the weight of the reactant (1) and the weight of the reactant (3) being between 0.1% and 1% of the dry weight of the film.

5. A polyethylene terephthalate film coated by the process of claim 4.

References Cited

UNITED STATES PATENTS

| | | | |
|---|---|---|---|
| 2,487,569 | 11/1949 | Mackey | 96—22 X |
| 3,206,328 | 9/1965 | Shaw et al. | 117—161 X |
| 3,294,577 | 12/1966 | Mayer | 117—161 X |
| 3,303,051 | 2/1967 | Paul | 117—62.1 |

WILLIAM D. MARTIN, *Primary Examiner.*

J. E. MILLER, *Assistant Examiner.*